United States Patent [19]
Shehata

[11] Patent Number: 6,132,156
[45] Date of Patent: Oct. 17, 2000

[54] ECOLOGICAL SHIPLOADER

[76] Inventor: S. Ramsis Shehata, 28 Strathaven Mews, S.W., Calgary, Alberta, Canada, T3H 2G2

[21] Appl. No.: 09/060,073

[22] Filed: Apr. 15, 1998

[51] Int. Cl.$^7$ .................................................. B65G 67/60
[52] U.S. Cl. ..................................... 414/140.9; 414/141.8
[58] Field of Search ...................... 198/860.3; 414/137.4, 414/140.7, 140.9, 141.8, 291

[56] References Cited

U.S. PATENT DOCUMENTS

| | | | |
|---|---|---|---|
| 4,082,181 | 4/1978 | Berthold et al. | 414/140.9 X |
| 4,712,962 | 12/1987 | Johnston | 414/140.9 |
| 4,925,010 | 5/1990 | Pallasvirta | 414/140.9 X |
| 5,193,964 | 3/1993 | Soros | 414/140.9 |
| 5,727,918 | 3/1998 | Arend et al. | 414/140.9 X |
| 5,871,324 | 2/1999 | Horak | 414/140.9 |

FOREIGN PATENT DOCUMENTS

| | | | |
|---|---|---|---|
| 2441912 | 3/1976 | Germany | 198/860.3 |
| 2265135 | 9/1993 | United Kingdom | 414/140.7 |

*Primary Examiner*—Janice L. Krizek

[57] ABSTRACT

A ship loading installation for loading bulk materials at a sea port into a ship or barge using a loading system comprised of a projecting boom structure mounting a first belt conveyor portion therein and provided with means for vertical luffing motions, said projecting boom structure pivotally connected to a shuttling support structure mounting a contiguous second belt conveyor portion therein, said support structure arranged to shuttle linearly of the longitudinal axis of the conveyor portions on a horizontal rail bed or other suitable travelway mounted to the upper surface of a beam structure, said beam structure pivotally connected to a fixed pivot base at one end remote from the dockside end enabling horizontal arcuate stewing motions of the beam structure, its other end being arranged with a set of wheels on a curved travelway to support the beam structure as it slews through its arcuate path of travel, said support structure being provided with a sealed loading arrangement from a source of bulk material, said first and second belt conveyor portions being motivated to deliver said bulk material generally from the loading point in the direction of the projecting boom to be discharged from the projecting end of the boom at a suitable height and linear and radial position as to fall generally into the cargo hold areas of a ship or barge; the improvement being managing dust and spillage associated with the operation, of the ship loading installation by arranging, in combination, such boom and support structures as sealed tubular structures with auxiliary flexible sealing means, within which the first and second belt conveyor portions are mounted in sealed configuration, thereby to effectively contain for subsequent collection and disposal any fugitive dust and/or spillage of bulk material which would otherwise pollute the local environment of the bulk materials handling facility.

1 Claim, 4 Drawing Sheets

FIGURE 5
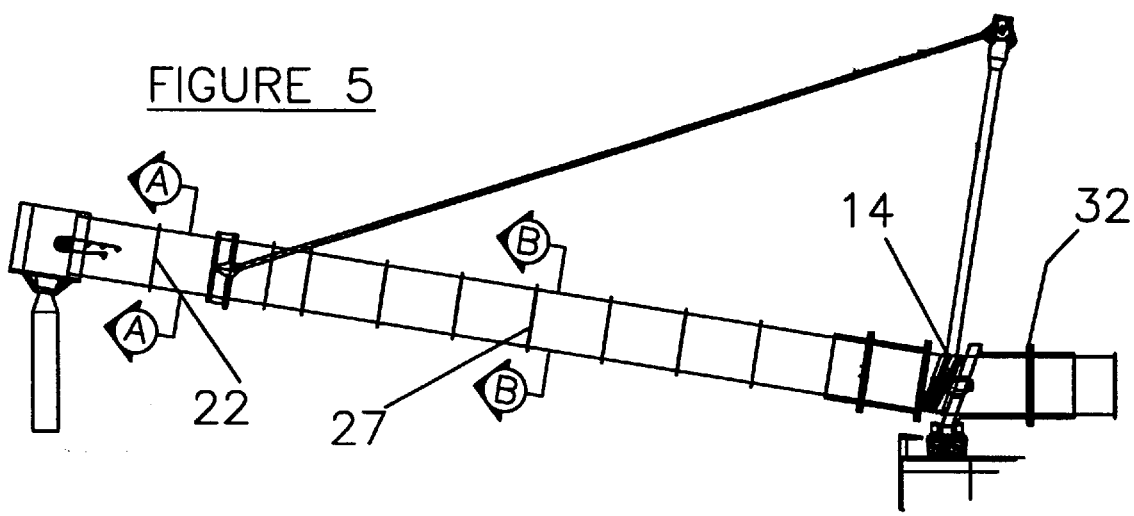
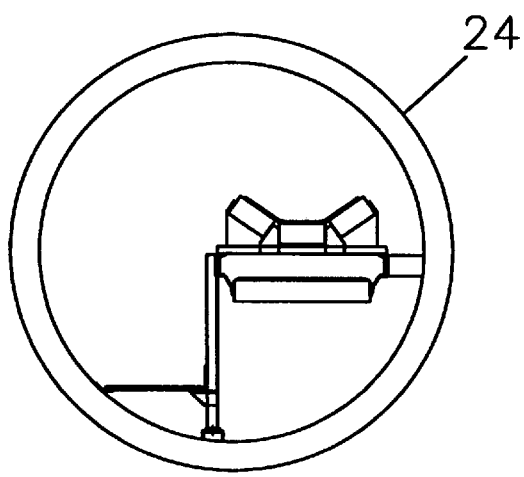
FIGURE 6
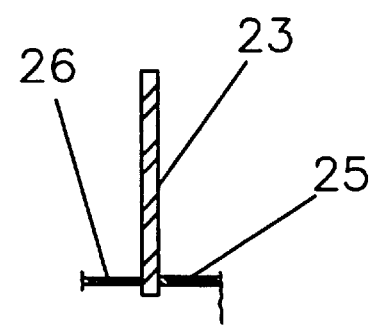
FIGURE 7
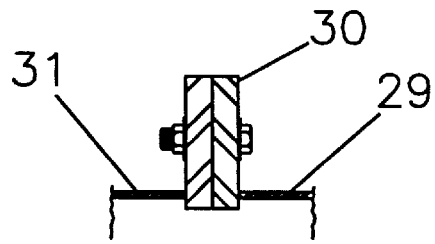
FIGURE 8
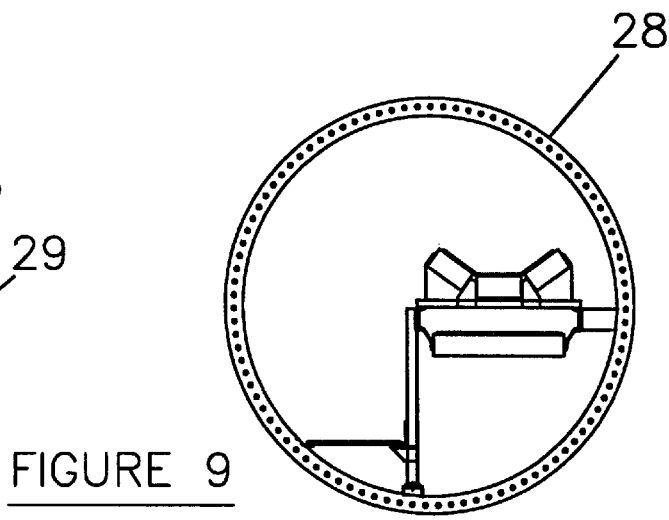
FIGURE 9

ECOLOGICAL SHIPLOADER

PRIOR ART

Many known methods have been devised for the loading of ships, barges, rail cars and trucks which are the common carriers for bulk transportation of various goods. For purposes of the invention described in this disclosure, bulk carriers are relatively large containers or vessels adapted for holding and transporting tens or hundreds or thousands of tons of loose, granular, unpackaged bulk materials by land or sea. A few examples of such materials would be salt, potash, coal, sulphur, certain agricultural products and ore concentrates from mining plants, as opposed to bundled or packaged goods such as lumber, containers, automobiles or the like.

Loading of such bulk carriers has created a requirement for suitable facilities for receiving, storage and subsequent reloading of the bulk material into the bulk carriers at high material transfer rates. Optimal facilities for train and truck loading have tended to evolve into overhead bin structures from which loading can take place by gravity through chutes into the truck or train cars which may pass slowly through the loading station so as to distribute the bulk materials uniformly longitudinally of the train of bulk container vessels, which may be relatively narrow in relation to their aggregated length. Optimal loading facilities for barges or ships have required greater horizontal reaching flexibility of the loading facility to accommodate typically larger containment vessel volumes, consequently much greater fore and aft and transverse and vertical reaching capability of the loading machinery into the bulk vessel. Such facilities have therefore evolved into elaborate dockside structures which may travel linearly or radially of the moored barge or ship and mounting cantilevered booms or gantry-style cranes equipped with large clamshell buckets for loading or unloading of the bulk materials through large, open hatches on the upper deck.

The projecting cantilevered boom element of the ship loading installation spanning the horizontal interval from dockside to the edge of the ship and reaching beyond into an overhead loading relationship with the cargo hold areas of the barge or ship is therefore a key mechanical component of the ship loading installation. Its specification including reach and weight and constructional details determines the mechanical and structural requirements of every other part of the ship loading installation. As such, its weight is very critical to the cost effectiveness of the design of the bulk materials handling system. Largely due to this consideration, conventional ship loading installation design practice is to arrange such cantilevered booms as structural lattice beams or box girder structures, suitably reinforced to resist lateral forces and provided with mounting points for carrying the corresponding reach of the bulk materials handling system. A typical example of such construction is illustrated in U.S. Pat. No. 4,082,181, in which Berthold et al. refer to a box girder construction to which a separate covering must be added to achieve enclosure of the structure. In view of the prior art an important objective of this invention is to provide a simple, lightweight, projecting boom structure for a ship loading installation adapted to carry a bulk materials handling belt conveyor and simultaneously enclosing it.

Shiploading facilities using belt conveyor systems have become a preferred technology for many bulk materials due to their characteristically high efficiency, reliability and large volume delivery rate capability into such vessels in step with the economic need for ever faster delivery cycle times, being capable of delivery rates of up to or exceeding 5,000 tonnes per hour from a loading position at a bulk materials receiving and storage yard to a remote delivery position as required by the layout of the loading facility. Loading of the belt conveyor is typically done by known controlled rate flow metering systems, but final unloading from the belt conveyor is typically done into a semi-enclosed space such as a bin or hopper or cargo hold area of a vessel, if not onto a storage pile on the ground or a continuing conveyor belt to a further remote location.

An important and problematic characteristic of conveying loose, granular materials is that the carrying and return belt strands of the belt conveyor are exposed to the environment and are thereby vulnerable to wind disturbance causing a loss of dust into the atmosphere along the exposed length of the conveyor belt. In fact, there is characteristically a continuous generation and loss of particulate material as fugitive dust into the air. Further, if material loading of the belt conveyor is not optimised as to a uniform rate of loading, or is not loaded centrally of the belt at the loading point or the belt is not trained correctly on the supporting idlers for the carrying strand there may occur an actual spillage of granular material along the entire length of the conveyor belt. The belting material further contributes to continuous spillage along its entire length due to the carry-over of particulate materials sticking to the surface of the belt and falling off during the return run of the belting as it passes, in inverted attitude, over the return idler sets.

Many attempts have been made to solve these disadvantageous characteristics of belt conveyors, with varying levels of success or lack thereof. Many solutions have involved, for example, designs of wind shields in the form of removable cover plates attached to the conveyor support and boom structures. Many versions of belt scrapers and collection pans to capture spillage under the belt have also been designed. All of the cover plate and dribble pan solutions add undesirable weight to the cantilevered boom structure and further, render access for inspection and maintenance of the belt conveyor system more difficult. Known belt scraper designs in the art are marginally effective at best and no dribble pan solutions have ever completely solved the spillage problem. An important objective of this invention, therefore, is to shield the conveyor belt of a ship loading installation from the wind while containing all air-borne dust and material spillage within a sealed body structure.

It has also been known in the art to apply architectural enclosure surfaces to the outside of fixed, elevated belt conveyor structures for the purposes of dust and spillage control and weather protection of the enclosed bulk materials, also enabling inspection and maintenance access; such provisions are common, for example, on mining plant sites. Such designs are unsuited to mobile applications, particularly to projecting or cantilevered boom sections as may be found in ship loading installation applications due to excessive weight and poor sealing maintainability of the architectural panels. A further objective of this invention is to achieve dust and material spillage control and weather protection for a bulk materials handling belt conveyor of a ship loading installation within a simple, lightweight and easily maintainable body structure.

Such uncontrolled release of fugitive dust and spillage of materials into the environment at bulk materials handling facilities is becoming less tolerated especially as annual world-wide volumes of bulk transport rises for all commodities. Also, it may be appreciated that some commodities to be handled as bulk materials represent a greater hazard to the environment than others and some facilities are located in more environmentally sensitive areas than others. In fact, there are virtually no bulk materials loading technologies that reliably and economically offer a clean and environmentally acceptable loading methodology for such bulk materials into barges or ships. A further objective of this invention, therefore, is to achieve reliable containment of all dust emissions and material spillage typically associated with the loading of bulk materials into barges or ships.

These and other objectives of the invention will become apparent upon examination of the figures with the detailed specification of the disclosed ship loading installation design.

SPECIFICATION

The invention will now be described with reference to the drawings. The general arrangement and mode of operation of the ship loading installation is seen in FIGS. 1 to 4 in which:

FIG. 1 is an elevation view of a ship loading installation 1 incorporating preferred embodiments of the invention, said ship loading installation shown in loading relationship to a ship 2 at a dockside 3 and arranged to receive material from a fixed bulk materials handling system 4 for delivery of bulk materials to the ship loading installation;

FIG. 2 is a plan view corresponding to FIG. 1 showing a ranging diagram for discharging bulk materials into cargo hold areas 5 of a ship or a barge as by the ship loading installation of FIG. 1; the ship loading installation being motivated to slew arcuately about a pivot axis 19 and to shuttle forwardly and backwardly to enable discharge of bulk materials at any position within the shaded area in the figure;

FIG. 3 is a typical cross-sectional view of the tubular structure of the ship loading installation 1, showing a belt conveyor 7 totally enclosed by the tubular structure 6 and also enclosing a walkway 8 for personnel access;

FIG. 4 is a elevation view of a ship loading installation incorporating preferred embodiments of the invention showing a first bulk materials handling belt conveyor portion 9 mounted within a sealed projecting tubular boom structure 6 and discharging through a chute 10 having flexible sealing means 11 arranged between the boom structure and the loading chute, a second contiguous bulk materials handling belt conveyor portion 12 mounted within a sealed tubular support structure 13 which is pivotally connected to said boom structure within the flexible sealing element 14 at its end opposite from the projecting end, said support structure being motivated to shuttle, forwardly and backwardly, linearly of the longitudinal axis of the belt conveyor portions a distance of, for example, 18 meters on a horizontal rail bed or other suitable travelway mounted to the upper surface of a beam structure 18, said support structure 13 being equipped with a longitudinal loading slot 15 in its upper, rearward portion to facilitate receiving bulk materials from fixed bulk materials handling system 4 at any linear position of the said support structure, said support structure also mounting a substantially vertical mast 16 equipped with a system of cables 17 which may be actuated by a winch or by other known means so as to enable plus 15 to minus 5 degree vertical luffing motions of the boom structure while supporting the boom structure in a projecting loading relationship over the cargo hold areas of an adjacent ship 2 moored at dockside 3, said beam structure arranged transversely of the ship's longitudinal axis but pivotally connected to a fixed base 19 at its end remote from the dockside end to permit being motivated through plus 15 to minus 15 degree horizontal arcuate slewing motions of said beam structure carrying said support structure carrying said boom structure and said chute with the enclosed bulk materials belt conveyor delivery system, said beam structure being conveniently arranged with a set of wheels 20 on a curved travelway or rail bed 21 at its end adjacent to the moored ship to provide support for the beam structure at any position of its arcuate stewing motion; the ship loading installation so arranged whereby said first and second belt conveyor portions can be motivated to deliver said bulk material from the loading point in the direction of said projecting boom to be discharged from the projecting end of said boom structure through said loading chute at a suitable height and linear and radial position as to fall favorably into the cargo hold areas of a ship or barge as may be moored at dockside for loading.

In a preferred configuration, loading slot 15 in support structure 13 is fitted with flexible covers of known configuration, arranged to maintain continuous sealing of the slot around the loading chute of fixed bulk materials handling system 4, irrespective of whether or not the ship loading installation is caused to shuttle linearly or to slew arcuately about pivot point 19.

The preferred structural arrangement of the ship loading installation illustrated in FIGS. 1 to 4 has now been seen to comprise two contiguous sealed tubular structures forming a projecting boom structure and a support structure joined together by pivot and sealing means and containing bulk materials handling belt conveyor portions and provisions for sealed loading and discharging chute means. The preferred detailed arrangement of the boom structure and support structure can be further described with reference to FIGS. 5 to 14 in which:

FIG. 5 is an elevation view of the projecting tubular boom structure of the ship loading installation, shown connected to a portion of the tubular support structure at a horizontal axis pivot joint;

FIG. 6 is cross section A—A of the tubular boom structure at reinforcing ring 22;

Figure 1:
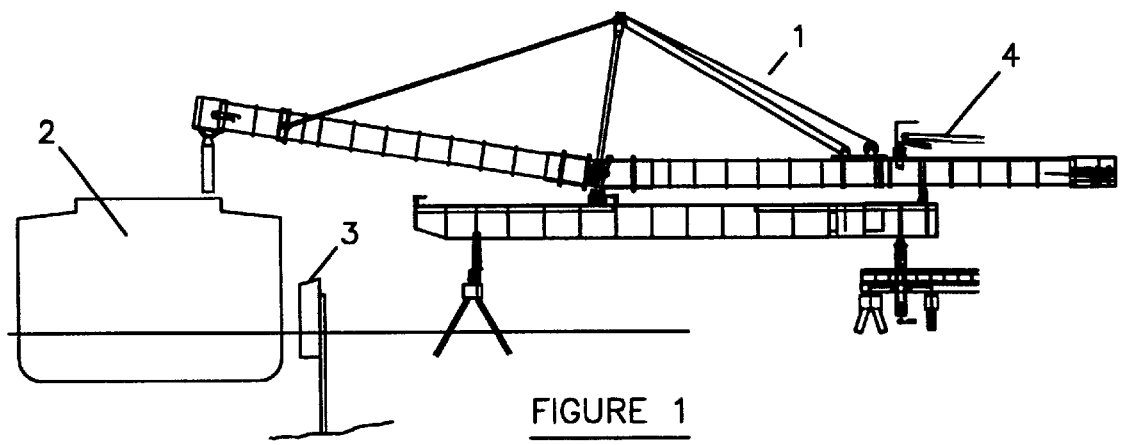
Figure 2:
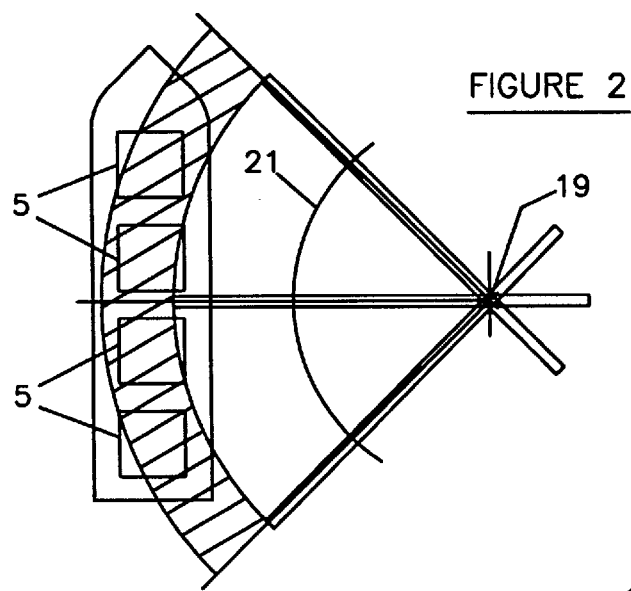
Figure 3:
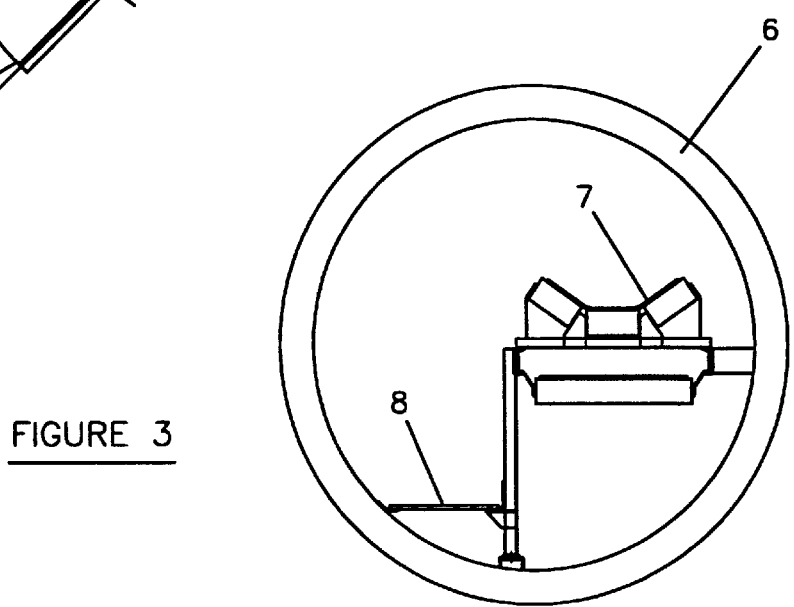
Figure 4:
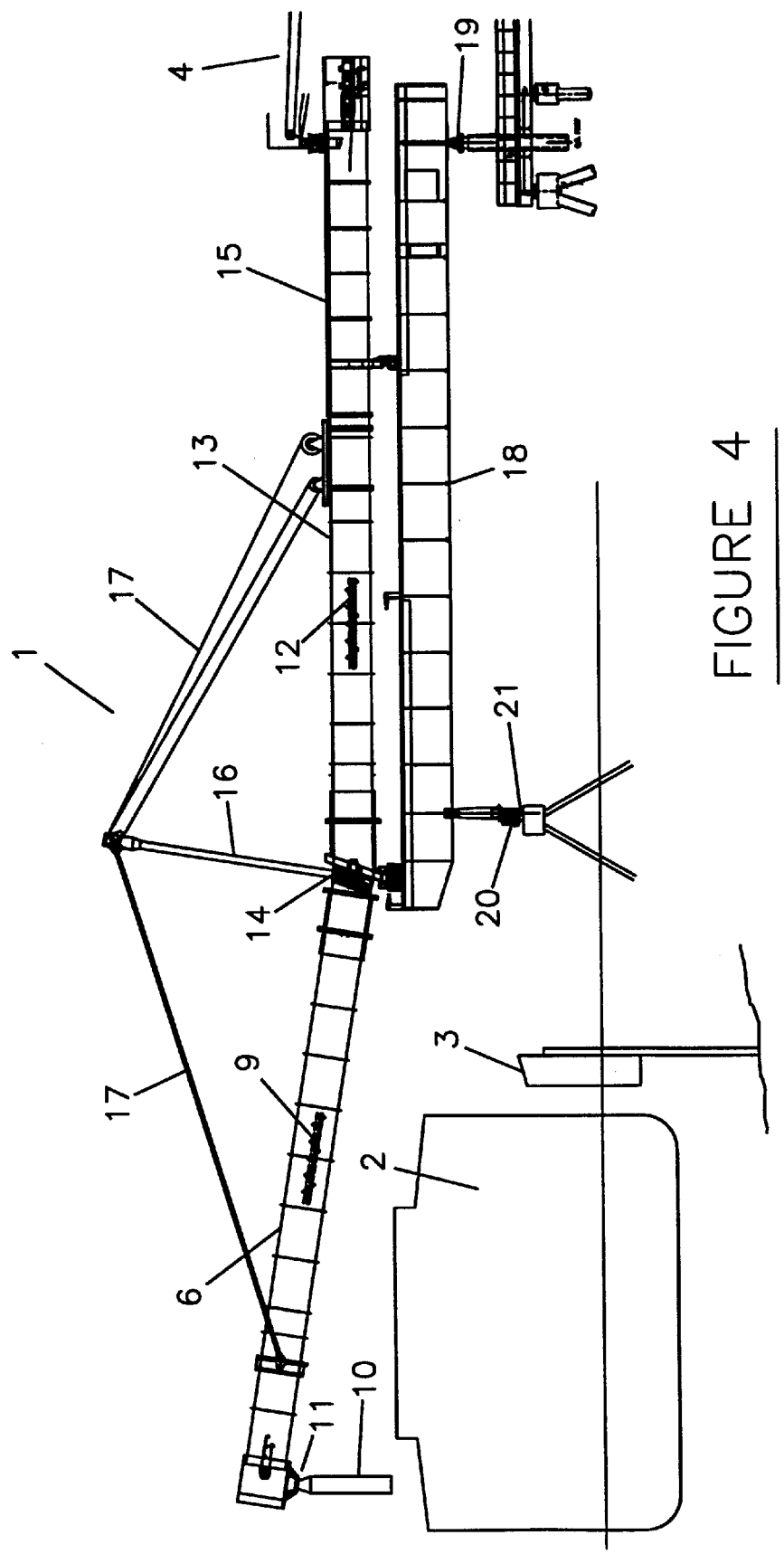
Figure 10:
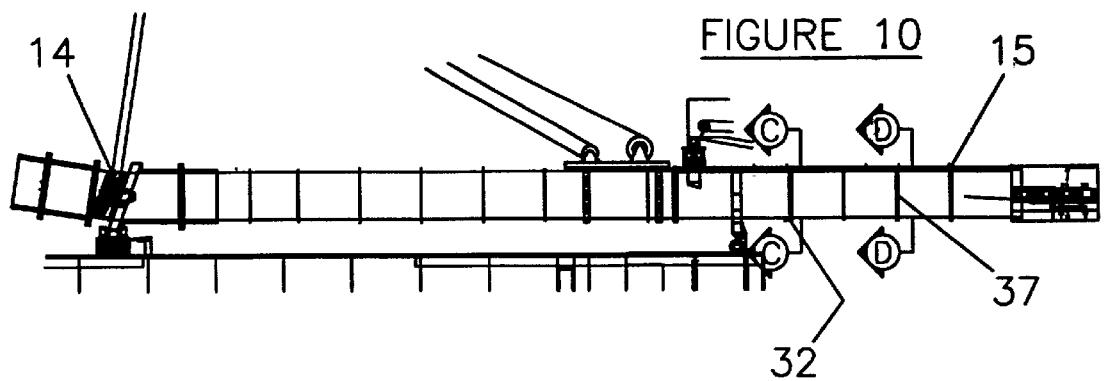
Figure 11:
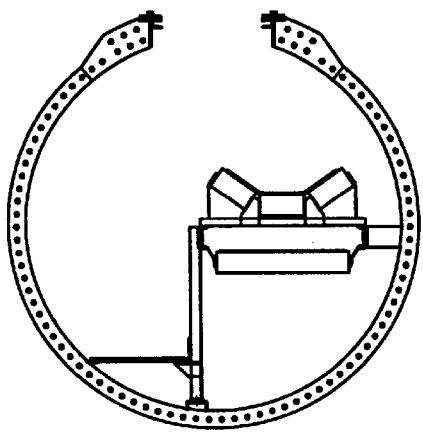
Figure 12:
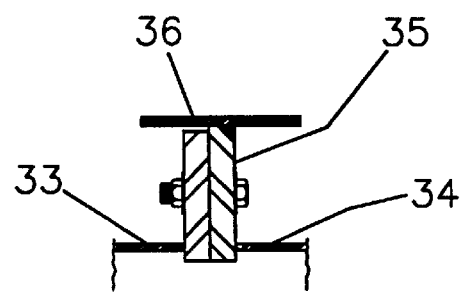
Figure 13:
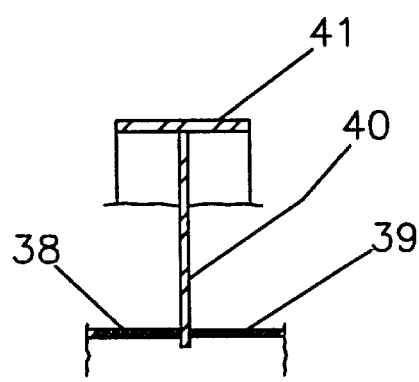
Figure 14:
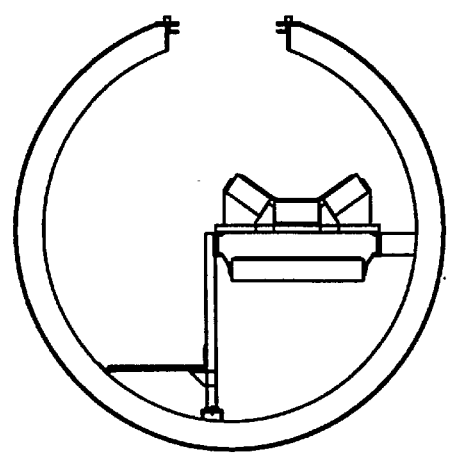

FIG. 7 is a detail fabrication cross section of reinforcing ring 22/23/24, also showing tube wall plate portions 25 and 26;

FIG. 9 is cross section B—B of the tubular boom structure at reinforcing ring 27;

FIG. 8 is a detail fabrication cross section of reinforcing ring 27/28, also showing tube wall plate portions 29 and 31;

FIG. 10 is an elevation view of the tubular support structure of the ship loading installation, shown connected to a portion of the tubular projecting boom structure at said horizontal axis pivot joint;

FIG. 11 is cross section C—C of the tubular support structure at reinforcing ring 32 showing the arrangement of the loading slot 15 at a bolted connection ring;

FIG. 12 is a detail fabrication cross section of reinforcing ring 32, also showing tube wall plate portions 33 and 34, reinforcing ring 35 and flange plate 36;

FIG. 14 is cross section D—D of the tubular support structure at reinforcing ring 37 showing the arrangement of the loading slot 15 at a welded connection ring;

FIG. 13 is a detail fabrication cross section of reinforcing ring 37; also showing tube wall portions 38 and 39, reinforcing ring 40 and flange plate 41.

The Figures illustrate linearly contiguous sections of pipe or tube of, for example, 108 inches diameter making up the tubular structures, said tube sections sealingly connected at reinforcing rings by welding as in FIGS. 6 and 7, 13 and 14 or by bolting as in FIGS. 8 and 9, 11 and 12. A first structural function of the reinforcing rings is to enable the tubular structure to resist buckling under the combined torsional, shear, moment and compression loads that it carries. A second function is to provide local reinforcement at locally stressed areas such as, for example, the pivot connection between the projecting boom structure and the support structure. The purpose of the bolted connections is to facilitate the field assembly of prefabricated lengths of the tubular structure, each of which may contain several multiples of welded tube and reinforcing ring sections. The design of the welded reinforcing ring 25/26 illustrated in FIGS. 6 and 7 is shown as a simple flat circular ring; FIGS. 13 and 14 illustrate an outside flange plate 41 welded to a simple ring 40 to achieve additional load capacity. Similarly, simple bolted reinforcing ring 28/30 in FIGS. 8 and 9 may alternatively also carry an outside flange plate 36 on reinforcing ring 35 as illustrated in FIGS. 11 and 12 to achieve lesser or greater load carrying capacity, respectively, in combination with the tube wall plate.

The tube itself may consist of relatively thin wall material of, for example, 6 to 8 millimeters thickness, illustrated in FIG. 7 as tube wall plate portions 25 and 26; in FIG. 8 as tube wall plate portions 29 and 31; in FIG. 12 as tube wall plate portions 33 and 34; in FIG. 13 as tube wall plate portions 38 and 39. Further, the tube wall plate thickness of linearly adjacent, sections of the tubular structure may be selectably varied in thickness at every section linearly of the total assembled length of tubular structure. In FIG. 7, tube wall plate portion 25 is shown to be thicker than linearly adjacent tube wall plate portion 26; in FIG. 13, tube wall plate portion 38 is shown to be thicker than linearly adjacent tube wall plate portion 39. In FIGS. 8 and 12, tube wall plate portions 29/31 and 33/34 are shown to be the same thickness at linearly adjacent lengths of tubular structure.

The ship loading installation design of this present invention is unique in providing, in combination, sealed tubular structures as the structural members of the projecting boom and support structures, flexible seal means spanning the main pivot joint to the projecting boom structure, flexible seal means to the materials discharge chute and flexible seal means to the bulk materials loading chute to obtain containment of the usual sources of pollution. Typical ship loading installation constructions of known art must employ separately fitted enclosure covers and dribble collection pans to attempt to control emissions of dust or other environmental pollution.

The tubular construction described is also uniquely amenable to minimizing structure weight by enabling the selectable matching of structural strength properties to structural loading at every position linearly of the length of the ship loading installation, whether by increasing or decreasing the tube wall plate thickness and/or by using stronger or weaker reinforcing rings of the types described. Other design arrangements of a projecting boom including the box girder design as in Berthold et al. in U.S. Pat. No. 4,082,181 are much more limited in terms of enabling selectable linearly variable structural properties for the purpose of minimizing structural weight.

The tubular construction described is also uniquely amenable to prefabrication of suitable lengths of ship loading installation structure for subsequent shipping/transportation to a remote field site and field erection by employing either welded or bolted reinforcing ring designs at selectable positions linearly of the length of the ship loading installation.

Although operation of the belt conveyor internally of the tubular structure will still cause the generation of fugitive dusting and spillage internally of the tubular structure, the fact of totally sealed enclosure and confinement of the airspace within the tubular structure throughout its span enables dust and spillage collection and disposal to be accomplished by known means on an as-required basis, thus accomplishing a zero emissions pollution objective for the ship loading installation.

Further, this method of enclosing the belt conveyor system within the tubular structure is not restrictive of access to belt conveyor components for purposes of inspection and maintenance, as opposed to other attempted wind screening and spillage collection solutions such as wind cover shielding and dribble pan components attached to the boom and conveyor belt system structures.

It is also well known in the art that shiploaders, stackers, reclaimers or other bulk materials handling machinery which may employ a travelling gantry style of loading or reclaiming materials handling system, elements of which may span a bulk materials handling yard or a ship or the like and be provided with linear and transverse motion capability on linear road or rail beds as opposed to the arcuate stewing and linear shuttling motions described herein, in which case the sealed tubular structure design described herein may apply equally to any cantilevered, spanning, projecting or other reaches of the bulk materials delivery conveyor system employed in such machinery.

Also well known in mining is the use of single or combinations of mobile or semi-mobile bridge conveyors, stackers, reclaimers or the like employing cantilevered, spanning, projecting or other reach portions of a bulk materials handling system through single or multiple bulk materials handling conveyor units, in which case the invention described herein may apply equally to any such machinery.

What is claimed is:

1. A ship loading installation comprising:

(a) an elongate beam structure having a proximal end and an opposed distal end, the proximal end mounted to a fixed pivot means, wheel means mounted to said distal end of said beam structure which engage an arcuate rail bed, said beam structure pivoting about a vertical axis intersecting said pivot means;

(b) a tubular support structure having a proximal end, an opposed distal end and wheel means, said tubular support structure wheel means engaging said beam structure enabling movement of said support structure along a longitudinal axis of said beam structure, a loading slot opening formed in the proximal end of said tubular support structure;

(c) a tubular boom structure having a proximal end and a distal end, the proximal end of said tubular boom structure pivotally mounted to the distal end of said support structure within a flexible seal means;

(d) a chute pivotally mounted to the distal end of said boom structure; and (e) belt conveyor means mounted in said tubular support structure and said tubular boom structure which receives material from a handling system through said loading slot opening and discharges material through said chute.

* * * * *